(12) United States Patent
Kim et al.

(10) Patent No.: US 9,781,559 B2
(45) Date of Patent: Oct. 3, 2017

(54) APPARATUS AND METHOD FOR ESTABLISHING COMMUNICATION LINK

(71) Applicant: Electronics and Telecommunications Research Institute, Daejeon (KR)

(72) Inventors: Young-Hoon Kim, Daejeon (KR); Soo Seon-Ae Kim, Daejeon (KR); Soo Chang Kim, Daejeon (KR); Byung-Jae Kwak, Daejeon (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 124 days.

(21) Appl. No.: 14/805,092

(22) Filed: Jul. 21, 2015

(65) Prior Publication Data

US 2016/0157284 A1    Jun. 2, 2016

(30) Foreign Application Priority Data

Jun. 18, 2014    (KR) .................. 10-2014-0074534

(51) Int. Cl.
*H04W 4/02*    (2009.01)
*H04W 76/02*    (2009.01)
(Continued)

(52) U.S. Cl.
CPC ............ *H04W 4/023* (2013.01); *H04W 76/02* (2013.01); *H04W 84/12* (2013.01); *H04W 84/18* (2013.01)

(58) Field of Classification Search
CPC ....... H04W 4/02; H04W 4/021; H04W 4/023; H04W 4/025; H04W 4/026; H04W 4/028;
(Continued)

(56) References Cited

U.S. PATENT DOCUMENTS 8,458,363 B2    6/2013    Rosenblatt et al.
2006/0256959 A1*    11/2006    Hymes ................ H04M 1/26
                                                    379/433.04
(Continued)

FOREIGN PATENT DOCUMENTS

KR          100946673 B1      3/2010
KR        1020110117906 A    10/2011

OTHER PUBLICATIONS

R. W. Woodings et. al., Rapid Heterogeneous Ad Hoc Connection Establishment: Accelerating Bluetooth Inquiry Using IrDA, WCN Conference, Mar. 2002, 342-349, vol. 1, IEEE.

*Primary Examiner* — Benjamin H Elliott, IV
(74) *Attorney, Agent, or Firm* — William Park & Associates Ltd.

(57) ABSTRACT

A method for a communication link establishing device to establish a communication link in a targeted communication system is provided. A source terminal transmits a source terminal's identification information and threshold value information for selecting a relative angle measurement target to neighboring terminals including a target terminal, and transmits a relative angle measurement request signal to the target terminal and the neighboring terminals. Upon receipt of a response signal for the relative angle measurement request signal from at least one of the neighboring terminals including the target terminal, a communication link with the selected communication target's terminal is established based on the information contained in the response signal.

16 Claims, 4 Drawing Sheets

(51) Int. Cl.
*H04W 84/12* (2009.01)
*H04W 84/18* (2009.01)

(58) Field of Classification Search
CPC . G01S 1/08; G01S 3/00; G01S 5/0036; G01S 5/009; G01S 5/0252; G01S 5/0284
See application file for complete search history.

(56) References Cited

U.S. PATENT DOCUMENTS

| | | | |
|---|---|---|---|
| 2008/0150804 A1* | 6/2008 | Kalliola | G01S 3/74 342/443 |
| 2011/0169947 A1* | 7/2011 | Gum | G06F 17/3087 348/135 |
| 2011/0210831 A1 | 9/2011 | Talty et al. | |
| 2011/0263202 A1 | 10/2011 | Lee et al. | |
| 2013/0301406 A1* | 11/2013 | Sakata | G08G 1/092 370/229 |
| 2015/0024749 A1* | 1/2015 | Peng | H04W 36/32 455/436 |
| 2015/0331084 A1* | 11/2015 | Kim | G01S 5/0257 367/119 |
| 2016/0157284 A1* | 6/2016 | Kim | H04W 4/023 370/329 |

\* cited by examiner

APPARATUS AND METHOD FOR ESTABLISHING COMMUNICATION LINK

CROSS-REFERENCE TO RELATED APPLICATION

This application claims priority to and the benefit of Korean Patent Application No. 10-2014-0074534 filed in the Korean Intellectual Property Office on Jun. 18, 2014, the entire contents of which are incorporated herein by reference.

BACKGROUND OF THE INVENTION (a) Field of the Invention

The present invention relates to an apparatus and method for establishing a communication link with a target communication device.

(b) Description of the Related Art

For wireless communication systems such as Bluetooth, WiFi P2P, and cellular communication systems, a communication link needs to be established between two communication devises in advance to perform communication. In order to establish a communication link, it is necessary to know the communication identifier (e.g., phone number, SSID (Service Set Identifier), MAC Address, etc.) of an opposing device in advance and use it when establishing a communication link. However, if the communication identifier of a communication device with which one wants to establish a communication link in advance is not known, there is no way to establish a communication link with that device.

In a cellular communication system, a communication link is established by registering a device as a target for management by a base station through random access and calling the phone number registered as the device's identifier in the entire system. For Bluetooth or WiFi P2P, on the other hand, a list of SSIDs is created in a user's device by searching for nearby devices and collecting SSIDs, and then a communication link is established by selecting the SSID of a communication device the user wants to connect to.

Such a search process requires a lot of time. That is, when there are many devices near a device that wants to do a search, it takes a long time to do the search. Moreover, when many devices are searched, it takes a long time for the user to select a device it wants from the list.

Also, depending on application services, the user may not decide which device to select since they do not know the name of the device they want to communicate with, thus consuming more time. This can pose much inconvenience for the user and an obstacle to activating mobile services through direct communication.

To overcome this obstacle, technologies such as IrDA (Infrared Data Association) or NFC (Near Field Communication) are used so that the user can use a communication service after getting a Bluetooth or WiFi P2P communication identifier and establish a communication link easily and quickly.

IrDA is a method of establishing a communication link by pointing a source device toward an IrDA receiver attached to a target device to enable reception only from the target device and allow only the target device to inform the transmitting side of its communication identifier.

On the other hand, NFC enables communication terminals to establish an NFC or WiFi P2P communication link with each other by touching them together to get each other's communication identifier (NFC or WiFi P2P identifier).

It is necessary for the user to know the identifier of a target communication device in advance and search for the identifier in order to establish a communication link in existing communication systems, which imparts inconvenience to the user. In addition, there is no way at all to connect to a communication target whose identifier is not known, so there have been attempts to overcome this drawback through a combination of NFC and Bluetooth, a combination of IrDA and Bluetooth, or a combination of NFC and WiFi P2P. However, these methods have the disadvantage of having to move close (within 10 cm or 1 m) to the target device because they are available within very narrow ranges of use.

SUMMARY OF THE INVENTION

The present invention has been made in an effort to provide an apparatus and method for establishing a communication link with a target communication device when the device's communication identifier is not known.

An exemplary embodiment of the present invention provides a method for a communication link establishing device to establish a communication link in a targeted communication system, the communication link establishing device being included in both a source terminal and a target terminal.

The method includes: transmitting a source terminal's identification information and threshold value information for selecting a relative angle measurement target to neighboring terminals including a target terminal from the source terminal with the communication link establishing device embedded therein; transmitting a relative angle measurement request signal to the target terminal and the neighboring terminals from the source terminal; receiving a response signal for the relative angle measurement request signal from at least one of the neighboring terminals including the target terminal; and selecting a communication target based on information contained in the response signal and establishing a communication link with the selected communication target's terminal.

The transmitting of threshold information may include: upon receiving a communication target detection request signal from outside, capturing images of the target and extracting the target's image characteristics; and transmitting the source terminal's identification information and the threshold information and executing a counter included in the communication link establishing device to operate for a first predetermined period of time.

After the executing of the counter, the target terminal and each of the neighboring terminals may temporarily store the source terminal's identification information and the threshold information that are transmitted from the source terminal.

The receiving of a response signal may include: measuring the relative angle from the source terminal to each of the neighboring terminals including the target terminal; comparing the relative angle measurement with the threshold value information received from the source terminal; and if the measured relative angle is less than the threshold value, transmitting a response signal containing the relative angle measurement, the image characteristic values of a terminal user or object that are stored in the target terminal, and the identification information of the terminal that has made the relative angle measurement to the source terminal.

The establishing of a communication link may include: the source terminal checking whether any response signal has been transmitted from the target terminal or at least one of the neighboring terminals for a second predetermined period of time; if any response signal has been transmitted from at least one terminal for the second predetermined period of time, selecting any one of the at least one terminal as a communication target based on the relative angle measurement and the image characteristic values of the terminal user or object that are contained in the response signal; and establishing a communication link with the terminal selected as the communication target.

The selecting may include: applying preset weighted values to the relative angle and the result of matching, respectively; calculating a cost function by adding the weighted relative angle and the weighted result of matching; and aligning cost functions of all the terminals that have sent the response signal in the order of highest to lowest values and selecting the terminal whose cost function is the highest as the communication target.

Another exemplary embodiment of the present invention provides an apparatus for establishing a communication link in a targeted communication system.

The apparatus includes: a transmitted signal processor that transmits a relative angle request signal to neighboring terminals and transmits a response signal for a communication target detection request signal to a source terminal from the neighboring terminals; a received signal processor that measures the relative angle to each of the neighboring terminals upon receipt of a relative angle measurement request signal from a neighboring terminal and makes a relative angle measurement based on a relative angle measurement request signal transmitted from the source terminal; and an application processor that interfaces with the transmitted signal processor and the received signal processor, collects images of a target and extracts image characteristics upon receipt of a communication target detection request signal, stores a threshold value transmitted from the source terminal and the source terminal's identification information, and selects a target terminal with which a communication link is to be established, upon receipt of the relative angle measurements, identification information, and image characteristic information from the neighboring terminals.

The transmitted signal processor may include a DoA (Direction Of Attention) requesting signal transmitter that transmits a relative angle measurement request signal requesting each terminal neighboring the source terminal to measure the relative angle.

The received signal processor may include a DoA measurer that measures the relative angle to the source terminal and sends the relative angle measurement to the application processor upon receipt of a relative angle measurement request signal from the source terminal.

DETAILED DESCRIPTION OF THE EMBODIMENTS

Figure 1:
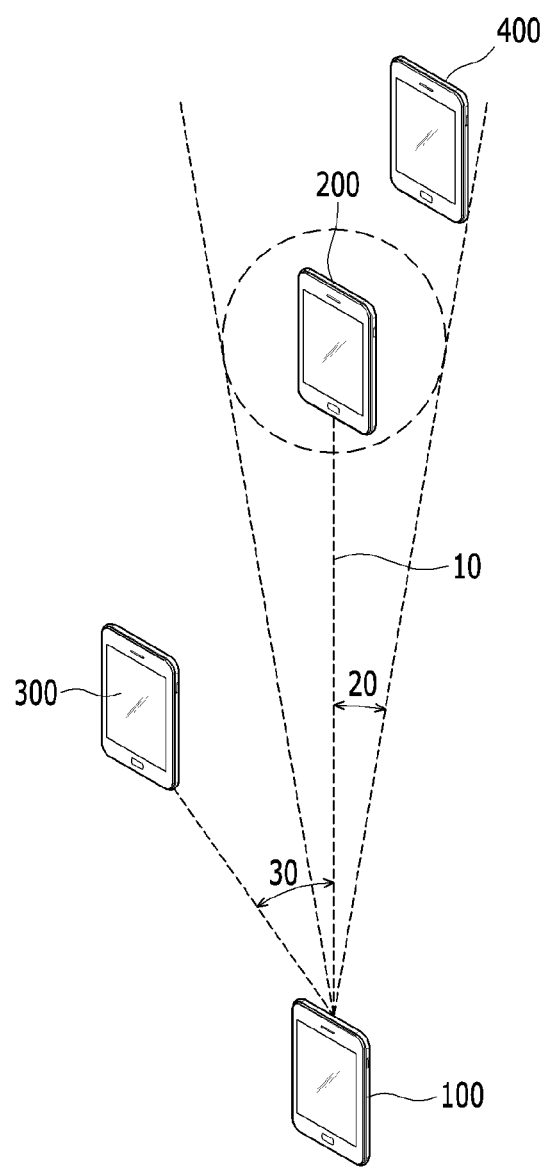
FIG. 1 is an illustration a simplified pairing situation according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

In the specification, a terminal may indicate a mobile station (MS), a mobile terminal (MT), a subscriber station (SS), a portable subscriber station (PSS), user equipment (UE), and an access terminal (AT), and it may include entire or partial functions of the mobile station, the mobile terminal, the subscriber station, the portable subscriber station, the user equipment, and the access terminal.

In the specification, a base station (BS) may indicate an access point (AP), a radio access station (RAS), a node B (NodeB), a base transceiver station (BTS), and a mobile multihop relay (MMR)-BS, and it may include entire or partial functions of the access point, the radio access station, the nodeB, the base transceiver station, and the MMR-BS.

Hereinafter, an apparatus and method for establishing a communication link with a target communication device when the device's communication identifier is not known according to an exemplary embodiment of the present invention will be described with reference to the drawings.

FIG. 1 is an illustration of a simplified pairing situation according to an exemplary embodiment of the present invention.

As shown in FIG. 1, it is assumed that a certain user wants to perform communication with a communication target (e.g., a person, a signboard, a printer, etc.) terminal 200 (hereinafter referred to as a 'target terminal' for ease of explanation) in a wireless communication system such as cellular, Bluetooth, WiFi P2P, etc. by using their own terminal (hereinafter referred to as a 'source terminal' for ease of explanation) 100. Then, the user obtains the identifier of the target terminal 200 easily and quickly by pointing the terminal 100 toward the target terminal 200 located within a visibility distance.

The source terminal 100 measures a relative angle from a line of sight 10 of the source terminal 100 viewing the target terminal 200 to each of a plurality of terminals 200, 300, and 400 (the relative angle is 30 if it is to the terminal 300). Using the relative angle measurements, terminals 200 and 400 located within a given angle 20 are selected from the terminals 200, 300, and 400.

With this in mind, a structure of the communication link establishing device included in each of the source terminal 100 and the target terminal 200 will be described with reference to FIG. 2.

Figure 2:
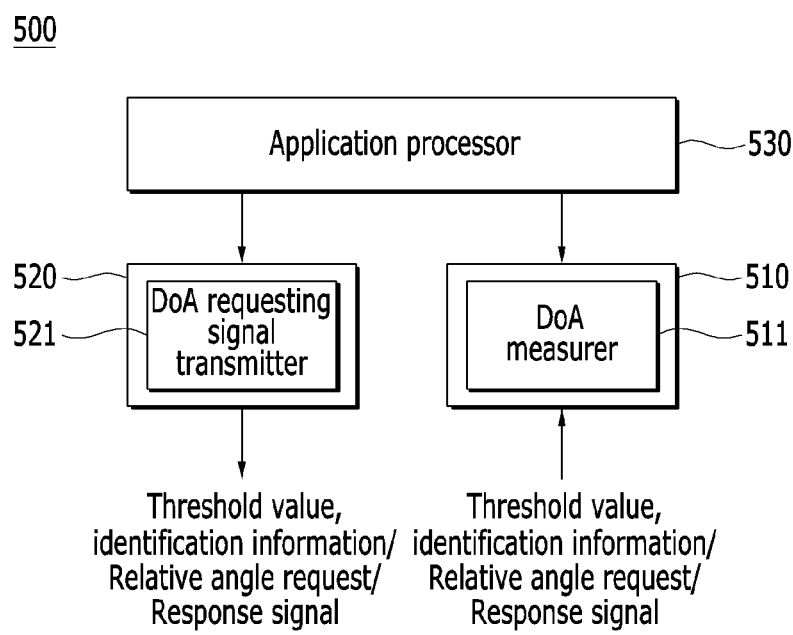
FIG. 2 is a view showing a structure of a communication link establishing device according to the exemplary embodiment of the present invention.

FIG. 2 is a view showing a structure of a communication link establishing device according to the exemplary embodiment of the present invention.

As shown in FIG. 2, a link establishing device 500 includes a received signal processor 510, a transmitted signal processor 520, and an application processor 530. The received signal processor 510 includes a DoA (Direction of Attention) measurer 511, and the transmitted signal processor 520 includes a DoA requesting signal transmitter 521. Although DoA is denoted by 'relative angle' in the exemplary embodiment of the present invention, the present invention is not limited thereto.

The received signal processor 510 processes signals transmitted from a base station or neighboring terminals through general functions (e.g., MAC, modem, RF, etc.) of a wireless communication system. The types of received signals and the method of processing received signals are already well-known, so detailed descriptions thereof will be omitted in the exemplary embodiment of the present invention. Moreover, upon receiving a DoA measurement request signal from the source terminal 100, the received signal processor 510 sends it to the DoA measurer 511 to measure the relative angle.

To this end, the received signal processor 510 includes the DoA measurer 511. The DoA measurer 511 is able to measure the relative angle by using either radio waves or sound waves. These methods are well-known, so detailed descriptions thereof will be omitted in the exemplary embodiment of the present invention.

The transmitted signal processor 520 processes a signal to be transmitted to neighboring terminals. That is, the transmitted signal processor 520, if included in the source terminal 100, transmits a relative measurement request signal to neighboring terminals.

The transmitted signal processor 520, if included in any one of the neighboring terminals, sends a relative angle measurement made by the DoA measurer 511, along with image characteristic values stored in the transmitted signal processor 520, to the source terminal 100 that has requested to measure the relative angle. The types of transmitted signals and the method of processing transmitted signals are already well-known, so detailed descriptions of them will be omitted in the exemplary embodiment of the present invention.

The transmitted signal processor 520 includes the DoA requesting signal transmitter 521. The DoA requesting signal transmitter 521 requests the neighboring terminals to measure the relative angle. The DoA requesting signal transmitter 521 requests only the terminals located in front of the source terminal to measure the relative angle by beamforming, etc. This is already well-known, so a detailed description of it will be omitted in the exemplary embodiment of the present invention. The request for measurement of the relative angle includes the source terminal 100's identification information and a threshold value (20 of FIG. 1) indicating the range of response after the measurement of the relative angle from the source terminal 100.

The application processor 530 is connected to the received signal processor 510 and the transmitted signal processor 520, and upon receiving a communication target detection request signal, photographs the target terminal 200 to collect images of the target terminal 200 and extracts the target terminal 200's characteristics. As soon as the image collection and the characteristics extraction are complete, a counter (not shown) embedded in the application processor 530 is executed.

Moreover, the application processor 530 installed in each of the plurality of terminals including the target terminal 200 temporarily stores the threshold value and the identification information of the source terminal 100 which are sent from the source terminal 100. Based on the results of matching using the relative angle measurements and image characteristic values transmitted from the plurality of terminals, the application processor 530 selects the target terminal 200 from the plurality of terminals and establishes a communication link with the target terminal 200. Although the exemplary embodiment of the present invention has been described with an example in which the application processor 530 establishes a communication link, the present invention is not necessarily limited to this example. The method of establishing a communication link is already well-known, so a detailed description thereof will be omitted in the exemplary embodiment of the present invention.

A method for establishing a communication link between the source terminal 100 and the target terminal 200 through the above-described communication link establishing device 500 will be described with reference to FIG. 3. Although the exemplary embodiment of the present invention depicts only one target terminal 200, among the plurality of terminals, for ease of description, at least one terminal may be located near the target terminal 200.

Figure 3:
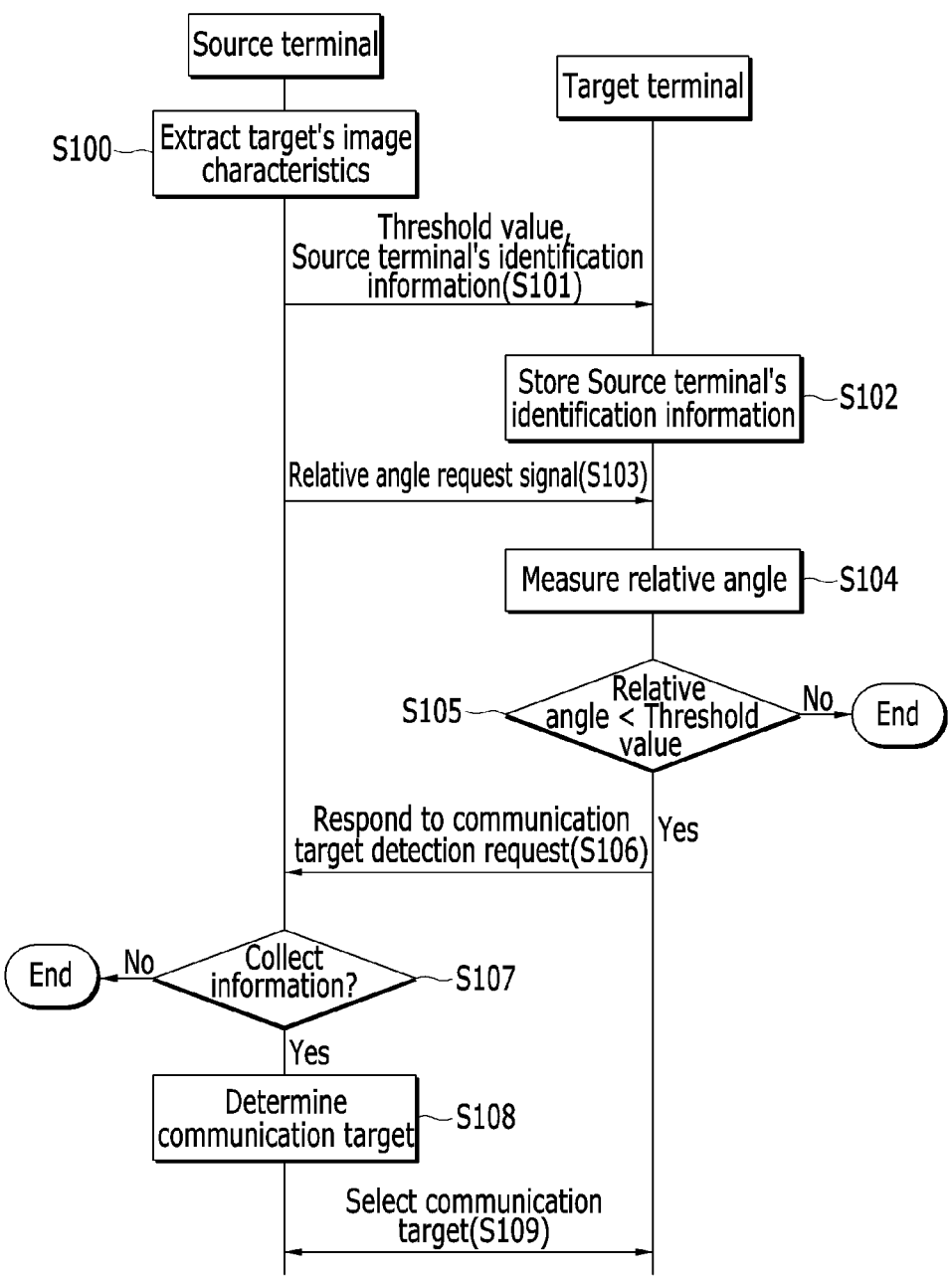
FIG. 3 is a flowchart of a method for establishing a communication link according to the exemplary embodiment of the present invention.

FIG. 3 is a flowchart of a method for establishing a communication link according to the exemplary embodiment of the present invention.

As shown in FIG. 3, the user of the source terminal 100 points the source terminal 100 toward a target for device-to-device communication. The target may be a person the user wants to communicate with, or an object (e.g., a signboard). If the target is a person, targeted communication is performed through the person's terminal. If the target is an object, targeted communication is performed through a terminal embedded in the object.

To point the source terminal 100, the user of the source terminal 100 places the source terminal 100 on a straight line with the target and presses a start button for detecting a communication target. The start button may be a preset button provided on the source terminal 100. For a terminal where a corresponding application is installed, a button appearing on the screen is used. However, the present invention is not limited to a certain type of button.

Next, the application processor 110 of the source terminal 100 photographs the target, and then extracts image characteristics of the target. Since the target is an object or a terminal user, image characteristics of the user's face or image characteristics of the object are extracted.

Information about a preset threshold value, along with the identification information of the source terminal 100, is transmitted to the neighboring terminals through the transmitted signal processor 520 interfacing with the application processor 110 (S101). Then, the application processor 110 executes the embedded counter for a predetermined period of time. The threshold value refers to the value of an angle from the source terminal 100 within which target terminals can be requested to measure the relative angle.

When the neighboring terminals receive the threshold value information transmitted from the source terminal 100 in S101 through the received signal processor 510 of the communication link establishing device 500 included in each of them, the application processor 530 connected to the received signal processor 510 temporarily stores the threshold value information and identification information of the source terminal 100 that have been received (S102).

The source terminal 100 sends a preset signal to the DoA requesting signal transmitter 521 of the communication link establishing device 500 inside the source terminal 100 (S103). The preset signal is a signal that the source terminal 100 sends via multiple antennas or multiple speakers to request the neighboring terminals including the target terminal to measure the DoA, that is, relative angle (S103). Although the exemplary embodiment of the present invention has been described with an example where the threshold value and the source terminal 100's identification information are transmitted first and then the relative angle measurement request signal is transmitted, the two pieces of information and the signal may be transmitted simultaneously.

The DoA measurer 511 of the received signal processor 510 of each of the neighboring terminals including the target terminal 200 measures the relative angle from the source terminal 100 to each neighboring terminal. The relative angle indicates the angle from the line of sight (10 of FIG. 1) of the source terminal 100 viewing the target terminal 200 to each terminal. Next, the relative angle measurement made by the DoA measurer 511 is sent to the application processor 530 (S104).

The application processor 530 compares the relative angle measurement made by the DoA measurer 511 with the threshold value received in S101 (S105). If the relative angle is greater than the threshold value, as is the case with the terminal 300 of FIG. 1, no response is made to the communication target detection request and the communication link establishment procedure is completed.

On the other hand, if the relative angle measured by the DoA measurer 511 in the target terminal 200 in S104 is less than the threshold value received from the source terminal 100, a response is made to the communication target detection request (S106). In this instance, the target's image characteristic values stored in the target terminal 200, the relative angle measured by the DoA measurer 511 in S104, and the target terminal 200's identification information are transmitted to the source terminal 100.

Such information is contained in a response signal and sent to the source terminal 100 using the identification information of the source terminal 100 transmitted by the source terminal 100 in S101.

The source terminal 100 collects information transmitted from each terminal for a first predetermined period of time. If no information is transmitted from any terminal for a second predetermined period of time, the user of the source terminal 100 is informed of this and the communication link establishment procedure is completed. This means that no terminal is located within the threshold angle from a straight line of the source terminal 100.

However, when information is transmitted from any one terminal within the second period of time, the source terminal 100 waits for the first period of time until it collects information from all the terminals. The first period of time is longer than the second period of time.

When information is transmitted from at least one terminal, the application processor 530 stores the result of matching obtained by matching the target's image characteristics extracted in S100 with the image characteristic values transmitted from each terminal in S106. The method of matching the image characteristics with the image characteristic values can be implemented in various ways, so the exemplary embodiment of the present invention is not limited to a certain method. Then, whether each terminal is the target terminal 200 or not is determined based on the relative angle measurement sent by each terminal (S108).

For determination, the application processor 530 calculates the cost functions of all the terminals that have sent information.

A cost function is calculated according to the following Equation 1:

$$C_T = \omega_I F_I + \omega_D F_D$$ (Equation 1)

where $\omega_I$ and $\omega_D$ are weighted values, and the sum $(\omega_I + \omega_D)$ of $\omega_I$ and $\omega_D$ does not exceed 1. $F_I$ is the result value of image characteristic matching sent from a terminal, and $F_D$ indicates the relative angle measurement made by the terminal. The exemplary embodiment of the present invention is described with an example where the result value of image characteristic matching and the relative angle are respectively normalized to '1'. Accordingly, the cost function $C_T$, which is a calculation value for determination, is normalized to a maximum of 1.

To identify whether the target terminal 200 is the communication target, the application processor 530 performs calculations using values transmitted from all the terminals according to Equation 1. Next, the calculation results are aligned in the order of highest to lowest values, and then sequentially displayed on the screen of the source terminal 100. When the user of the source terminal 100 selects the terminal having the highest value, a communication link is established using that terminal's identification information (S109).

According to the present invention, a communication link can be easily established, regardless of whether the identifier of a communication target device with which one wants to establish a communication link, among many neighboring devices, is known or not.

Moreover, limited ranges of use can be widened, and additional communication overhead for detecting identifiers can be reduced.

Additionally, a variety of mobile proximity services can be provided by establishing communication links with various types of neighboring targets (such as a person, a signboard, or equipment) which are within the coverage of a mobile proximity service.

Figure 4:
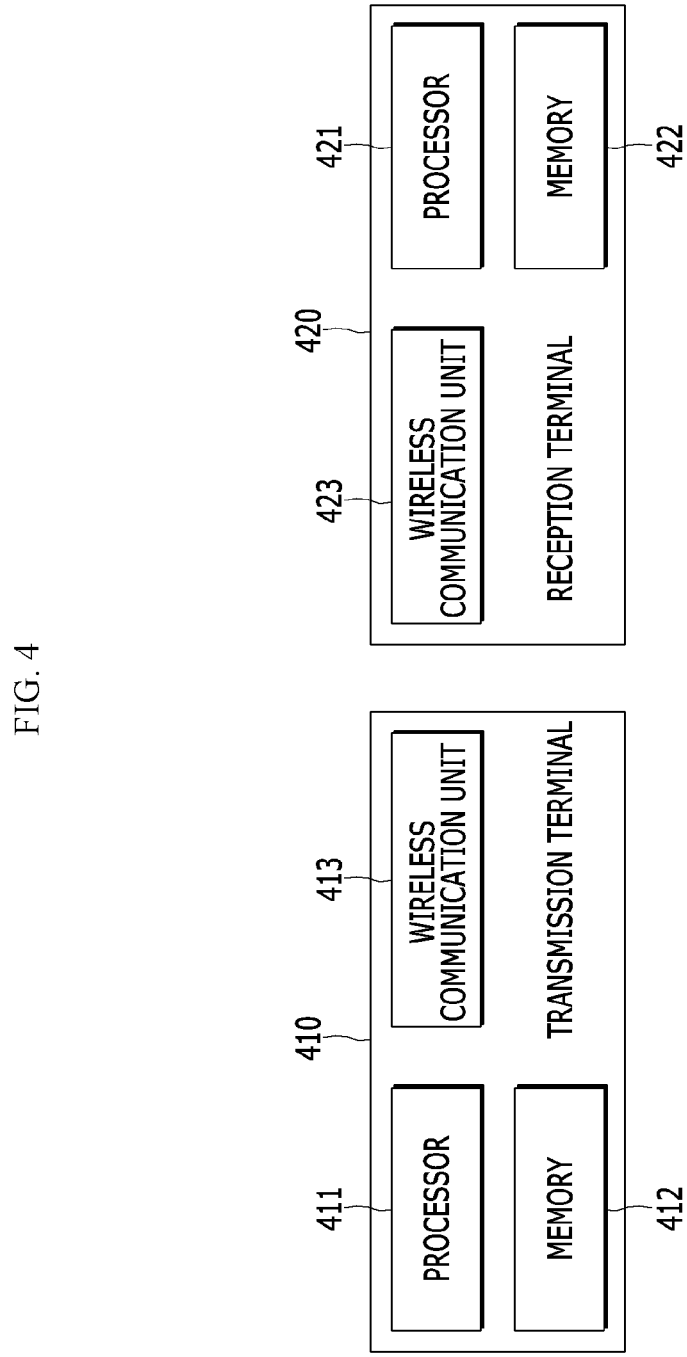
FIG. 4 is a block diagram illustrating a wireless communication system according to another exemplary embodiment of the present invention.

FIG. 4 is a block diagram illustrating a wireless communication system according to another exemplary embodiment of the present invention.

Referring to FIG. 4, the wireless communication system according to the exemplary embodiment of the present invention includes a transmission terminal 410 and a reception terminal 420.

The transmission terminal 410 includes a processor 411, a memory 412, and a radio frequency (RF) unit 413. The memory 412 is connected with the processor 411 to store various information for driving the processor 411. The RF unit 413 is connected with the processor 411 to transmit and/or receive a radio signal. The processor 411 may implement a function, a process, and/or a method which are proposed in the present invention. In this case, in the wireless communication system according to the exemplary embodiment of the present invention, a radio interface protocol layer may be implemented by the processor 411. An operation of the transmission terminal 410 according to the exemplary embodiment of the present invention may be implemented by the processor 411.

The reception terminal 420 includes a processor 421, a memory 422, and an RF unit 423. The memory 422 is connected with the processor 421 to store various information for driving the processor 421. The RF unit 423 is connected with the processor 421 to transmit and/or receive the radio signal. The processor 421 may implement a function, a process, and/or a method which are proposed in the present invention. In this case, in the wireless communication system according to the exemplary embodiment of the present invention, the radio interface protocol layer may be implemented by the processor 421. An operation of the reception terminal 420 according to the exemplary embodiment of the present invention may be implemented by the processor 421.

In the exemplary embodiment of the present invention, the memory may be positioned inside or outside the processor, and the memory may be connected with the processor through various already known means. The memory is various types of volatile or non-volatile storage media, and the memory may include, for example, a read-only memory (ROM) or a random access memory (RAM).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for establishing a communication link, by a communication link establishing device included in a source terminal in a targeted communication system, the method comprising:

transmitting identification information of the source terminal and threshold value information for selecting a relative angle measurement target to at least one neighboring terminal including a target terminal;

transmitting a relative angle measurement request signal to the at least one neighboring terminal;

receiving a response signal for the relative angle measurement request signal from the at least one neighboring terminal, wherein the response signal is transmitted when a relative angle between the source terminal and the at least one neighboring terminal measured by the at least one neighboring terminal is less than the threshold value; and selecting the target terminal based on information included in the response signal and establishing the communication link with the selected target terminal.

2. The method of claim 1, wherein the transmitting of threshold information comprises:

upon receiving a communication target detection request signal from outside, capturing image of a user of the at least one neighboring terminal and extracting an image characteristic value from the image; and transmitting the identification information and the threshold information, and executing a counter included in the communication link establishing device during a first predetermined period of time.

3. The method of claim 2, wherein after the executing of the counter, the identification information of the source terminal and the threshold information that are transmitted from the source terminal are temporarily stored by the at least one neighboring terminal.

4. The method of claim 2, wherein the response signal includes the relative angle, a pre-stored image characteristic value of a user of the at least one neighboring terminal stored in the at least one neighboring terminal, and identification information of the at least one neighboring terminal.

5. The method of claim 4, wherein when the relative angle is greater than the threshold value, information about the relative angle is discarded from the at least one neighboring terminal.

6. The method of claim 4, wherein the establishing of a communication link comprises:

checking whether another response signal has been received from the at least one neighboring terminal for a second predetermined period of time;

if said another response signal has been received from the at least one neighboring terminal for the second predetermined period of time, selecting one of the at least one neighboring terminal as the target terminal based on the relative angle and the pre-stored image characteristic value included in the response signal; and establishing the communication link with the target terminal.

7. The method of claim 6, wherein the selecting one of the at least one neighboring terminal as a target terminal based on the relative angle and the pre-stored image characteristic value included in the response signal comprises matching the pre-stored image characteristic value with the extracted image characteristic value and storing result of the matching.

8. The method of claim 7, wherein the selecting one of the at least one neighboring terminal as a target terminal based on the relative angle and the pre-stored image characteristic value included in the response signal comprises:

applying preset weighted values to the relative angle and the result of the matching, respectively;

calculating a cost function by adding the weighted relative angle and the weighted result of the matching; and aligning cost functions of the at least one neighboring terminal that have sent the response signal in the order of highest to lowest values and selecting the at least one neighboring terminal having the highest cost function as the target terminal.

9. An apparatus for establishing a communication link in a targeted communication system, the apparatus comprising:

a transmitted signal processor that transmits identification information of a source terminal and threshold value information for selecting a relative angle measurement target to at least one neighboring terminal including a target terminal, and transmits a relative angle measurement request signal to at least one neighboring terminal;

a received signal processor that receives a response signal for the relative angle measurement request signal from the at least one neighboring terminal, wherein the response signal is transmitted when a relative angle between the source terminal and the at least one neighboring terminal measured by the at least one neighboring terminal is less than the threshold value; and an application processor that interfaces with the transmitted signal processor and the received signal processor, and selects the target terminal based on information included in the response signal and establishes the communication link with the selected target terminal.

10. The apparatus of claim 9, wherein the application processor further performs capturing image of a user of the at least one neighboring terminal and extracting an image characteristic value from the image upon receiving a communication target detection request signal from outside and executing a counter during a first predetermined period of time.

11. The apparatus of claim 10, wherein the identification information of the source terminal and the threshold information that are transmitted from the source terminal is temporarily stored by the at least one neighboring terminal after the counter is executed.

12. The apparatus of claim 10, wherein the response signal includes the relative angle, a pre-stored image characteristic value of a user of the at least one neighboring terminal stored in the at least one neighboring terminal.

13. The apparatus of claim 12, wherein when the relative angle is greater than the threshold value, information about the relative angle is discarded from the at least one neighboring terminal.

14. The apparatus of claim 12, wherein the received signal processor further performs checking whether another response signal has been received from the at least one neighboring terminal for a second predetermined period of time; and the application processor further performs selecting one of the at least one neighboring terminal as a second target terminal based on the relative angle and the pre-stored image characteristic value included in the response signal if the another response signal has been received from the at least one neighboring terminal for the second predetermined period of time and establishing the communication link with the target terminal.

15. The apparatus of claim 14, wherein the application processor further performs matching the pre-stored image characteristic value with the extracted image characteristic value and storing result of the matching.

16. The apparatus of claim 15, wherein the application processor further performs applying preset weighted values to the relative angle and the result of the matching, respectively, calculating a cost function by adding the weighted relative angle and the weighted result of the matching, and aligning cost functions of the at least one neighboring terminal that have sent the response signal in the order of highest to lowest values and selecting the at least one neighboring terminal having the highest cost function as the target terminal.

* * * * *